United States Patent
Rajewski et al.

(10) Patent No.: US 10,612,581 B2
(45) Date of Patent: Apr. 7, 2020

(54) ANTI-THEFT SCREW PART FOR ATTACHING A WHEEL RIM TO A MOTOR VEHICLE

(71) Applicant: ABC UMFORMTECHNIK GMBH & CO. KG, Gevelsberg (DE)

(72) Inventors: Horst Rajewski, Hagen (DE); Holger Traeger, Bochum (DE)

(73) Assignee: ABC UMFORMTECHNIK GMBH & CO. KG, Gevelsberg (DE)

( * ) Notice: Subject to any disclaimer, the term of this patent is extended or adjusted under 35 U.S.C. 154(b) by 88 days.

(21) Appl. No.: 15/771,826

(22) PCT Filed: Oct. 26, 2016

(86) PCT No.: PCT/EP2016/075816
§ 371 (c)(1),
(2) Date: Apr. 27, 2018

(87) PCT Pub. No.: WO2017/072182
PCT Pub. Date: May 4, 2017

(65) Prior Publication Data
US 2018/0313395 A1    Nov. 1, 2018

(30) Foreign Application Priority Data
Oct. 30, 2015 (DE) .......................... 10 2015 118 613

(51) Int. Cl.
*F16B 41/00*    (2006.01)
*F16B 23/00*    (2006.01)

(52) U.S. Cl.
CPC ........ *F16B 41/005* (2013.01); *F16B 23/0046* (2013.01); *F16B 23/003* (2013.01)

(58) Field of Classification Search
CPC ........................... F16B 23/0007; F16B 41/005
(Continued)

(56) References Cited

U.S. PATENT DOCUMENTS 2,823,725 A * 2/1958 Trinca ..................... B60C 29/06
                                                        152/431
3,241,408 A * 3/1966 McCauley ............ B25B 13/485
                                                         81/436
(Continued)

FOREIGN PATENT DOCUMENTS

DE       1480817 A1    7/1969
DE      19902192 A1    7/2000
(Continued)

OTHER PUBLICATIONS

International Search Reort dated Jan. 5, 2017 re: Application No. PCT/EP2016/075816; pp. 1-2; citing: WO 2008/024093 A2 and EP 0 430 563 A1.

*Primary Examiner* — Flemming Saether
(74) *Attorney, Agent, or Firm* — Cantor Colburn LLP

(57) ABSTRACT

An anti-theft screw part includes an annularly extending recess for engaging an adapter, which as viewed from the outward direction to the inward direction is limited by an outer edge, a bottom, and an inner edge. The screw part is assembled of a main piece and an insert piece. The main piece forms the outer edge, the inner edge is formed by the insert piece. The outer edge is limited by an outer wall surface, located on an outer circle, and by several internal projections, projecting from the outer circle towards the rotational axis up to a first circular line. The inner edge is limited by an inner wall surface, located on an inner circle and limited by several outer projections, projecting from the inner circle towards the exterior up to a second circular line. The first circular line is located completely within the second circular line. The diameter of the second circular line is larger than the diameter of the first circular line.

11 Claims, 4 Drawing Sheets

(58) Field of Classification Search
USPC .................................................. 411/403, 910
See application file for complete search history.

(56) References Cited

U.S. PATENT DOCUMENTS

| | | | | |
|---|---|---|---|---|
| 4,211,128 A | * | 7/1980 | Plumer | B25B 13/485 |
| | | | | 411/403 |
| 4,473,169 A | | 9/1984 | Fitzgerald | |
| 4,686,874 A | * | 8/1987 | McCauley | B25B 13/485 |
| | | | | 292/251 |
| 6,295,900 B1 | * | 10/2001 | Julicher | B25B 13/485 |
| | | | | 411/910 |
| 7,278,341 B1 | * | 10/2007 | Novin | B25B 13/065 |
| | | | | 411/428 |
| 8,388,294 B2 | * | 3/2013 | Lanneree | F16B 41/005 |
| | | | | 411/403 |
| 8,992,151 B2 | * | 3/2015 | Parker | F16B 23/0046 |
| | | | | 411/402 |
| 9,004,836 B2 | * | 4/2015 | Wells | F16B 23/0007 |
| | | | | 411/402 |
| 9,765,807 B1 | * | 9/2017 | Watts | F16B 23/0061 |
| 9,815,324 B2 | * | 11/2017 | Yun | B25B 13/485 |

FOREIGN PATENT DOCUMENTS

| | | |
|---|---|---|
| EP | 0430563 A1 | 6/1991 |
| FR | 2658253 A1 | 8/1991 |
| WO | 2008024093 A2 | 2/2008 |

\* cited by examiner

ANTI-THEFT SCREW PART FOR ATTACHING A WHEEL RIM TO A MOTOR VEHICLE

TECHNICAL FIELD

The disclosure relates to an anti-theft screw part such as a wheel nut or a wheel bolt for attaching a wheel rim to a motor vehicle.

BACKGROUND

Anti-theft screw parts are employed, among others, for the theft protection of vehicle wheels. Typically, vehicle manufacturers deliver their vehicles as follows: The wheels are attached via commercially available bolts, mostly hexagon bolts, or there are provided threaded bolts, onto which the wheels are mounted and are fixed with appropriate nuts. Such wheels may be removed by general screw wrenches, i.e. for example, they may be stolen. Specific screw parts have already been known, having a specifically formed head, which only cooperates with a special wrench, i.e. an adapter. Thus, unwanted removal of a wheel may efficiently be interfered.

The anti-theft part of the above-mentioned type is know from DE 199 02 192 A1. In this screw part, several radial recesses starting from the outer circle radially extend outwardly, and forming pockets, into which a wrench may engage. The insert piece is located within an outer circle, within which an inner wall surface of the insert piece is located. The insert piece comprises radially protruding projections. Between the inner circle and the outer circle, a gap annularly extending across 360 degree remains free. Into this annular gap, a tubular tool may be inserted and may be rotated, e.g. with a cordless screwdriver. In doing so, the insert piece may be more and more abraded. In this way, the contribution to encryption locking, which is achieved by the insert piece, may become increasingly reduced. Consequently, it is easier to overcome encryption locking, which essentially is only determined by the outer edge. The different orientation of the insert piece in relation to the piece, and the formation of the insert piece are practically no more essential. A tubular tool will be sufficient that at least has radial recesses, so that it may engage into some of the radial recesses.

With another known screw part according to DE 14 80 817 A1, an annular recess is incorporated into the free end region, and especially is milled thereinto. Said recess having an almost regular contour and uniform width. Such milling is highly complex. Each screw part is required to be individually milled. If it is of desired to not always mill the same recess, the processing machines are required to be readjusted each time. This is highly complex and thus involves appropriately high cost.

Moreover, anti-theft screw parts are know from FR 2 658 253 B1 and U.S. Pat. No. 4,473,169 A.

SUMMARY

The disclosure provides an improvement of conventional anti-theft screw parts as described above in that an annularly extending gap, as it is known from state of the art, is to be avoided if possible, and it will be achieved for encryption locking, especially for the projections and recesses thereof, not to be able to be abraded by a rotary driven tool, e.g. a wireless screwdriver having tubular tool.

The disclosure provides an anti-theft screw part with a rotational axis and a recess formed at a free end region of the screw part and annularly extending, for engaging an adapter for rotating the screw part, which recess, as viewed from the outward to the inward direction, is limited by an outer edge, a bottom and an inner edge, wherein at least one of these edges form abutment faces for the adapter, the screw part is assembled of a main piece and an insert piece that are assembled and are firmly attached to each other, the main piece forming the outer edge and the inner edge being formed by the insert piece. The outer edge is limited by a) an outer wall surface, which is located on an outer circle, characterized in that the outer edge b) is limited by several internal projections, which project from the outer circle towards the rotational axis to a first circular line, in that the inner edge c) is limited by an inner wall surface, which is located on an inner circle and d) in addition, by several outer projections, which project from the inner circle towards the exterior to a second circular line, in that the first circular line is located completely within the second circular line, in that the diameter of the second circular line is larger than the diameter of the first circular line, and in that the internal projections and the outer projections are formed as cylinder segments.

Preferably, the diameter of the second circular line is at least 5% larger than the diameter of the first circular line.

The screw part according to the disclosure is configured in two parts. The main piece features essential functions of the screw parts. It preferably is formed such that it may comprehensively comprise the function of a screw part. The main piece has internal projections, forming abutment faces for the adapter, and serving as an encryption lock and a drive. It furthermore comprises a threaded portion.

The insert piece as well serves as an encryption lock and as a drive. For both the encryption lock and the drive, internal projections are provided. The insert piece may be employed in different angular positions in the very same main piece thus achieving a variety of encryption locks. However, it is not possible to dispose the insert piece in any desired angular position in the main piece. The internal projections project into the region between the external projections and vice versa.

Different insert pieces may be combined with a main piece. Preferably, several different main pieces are respectively combined with several insert pieces differently formed and in turn having different angular orientation. The adapter is required to be specifically formed. Preferably, encryption locking is selected such that also a modified adapter, which has an area of engagement extending across only 180 degrees instead of 360 degrees, ideally does not fit onto another one of the different screw parts, except the one which it is designed for, and maximally fits onto one other part. Introduction of similar but false adapters will be avoided as far as possible.

The outer edge is only formed by the outer wall surface and the visible radial outer surfaces of the n internal projections. The inner edge is only formed by the inner wall surface and the den visible radial outer surfaces of the m external projections.

Annular recesses will be achieved, the width thereof typically varies throughout across the course of 360 degrees. Such recesses are not known from state of the art and may practically be realized in prior art by milling only with highest effort, and in any case are to be laboriously manufactured. By the width of the annular recess, wherein the width is different dependent on the angle, additional safety against theft is obtained with the screw part nach of the disclosure. It is of advantage for the recess in a plane, as viewed transversally to the rotational axis, to have at least one, preferably two to four, radial regions with large gap width, where the gap width is determined by the difference of the radii of the outer circle and the inner circle, and moreover several, typically six to ten, radial regions having smaller gap width, where the gap width is determined by the difference of the radii of the outer circle and the second circular line or the difference of the radii of the first circular line and inner circle. The region is located on a circular sector surface about the rotational axis. A plane transversally to the rotational axis is also referred to as a radial plane.

Advantageously, the gap dimension of the recess in a plane, as viewed transversally to the rotational axis, at no location and at any arbitrarily oriented measuring line, is smaller than the difference of the radii of the outer circle and the second circular line or the difference of the radii of the first circular line and outer circle. In other words, the clearance of the recess, at no location, is smaller than the difference of the radii of the outer circle and the second circular line or by the difference of the radii of the first circular line and outer circle. It is of advantage for the difference of the radii of the outer circle and the second circular line to be equal to the difference of the radii of the first circular line and outer circle.

The internal projections and the outer projections are formed as cylinder segments. Preferably, the cylinder segments extend across less than 180 degrees, but more than 120 degrees.

Advantageously, the internal projections are of identical shape with each other and/or the outer projections are of identical shape with each other. In particular, all projections, both the internal projections and the outer projections are of identical shape with each other.

Advantageously, the number of n of the internal projections is equal to the number of m of the outer projections or m is different of n by maximally 2, especially by 1.

The disclosure has the advantage that it is preferred for the main piece to be adapted to the drive, i.e. it is especially advantageous for the main piece to be able to be designed for form-fittingly cooperating with the adapter, whereas the insert piece may be designed to a lesser extent for introduction of the forces for the rotational movement and to a larger extent for encryption locking.

The course of the outer edge is configured similar to an internally toothed gear wheel. The course of the inner edge is configured similar an externally toothed gear wheel. For encryption locking, individual projections or teeth, respectively, may be larger or smaller than the other ones. In an interstitial space between two recesses of one kind, e.g. external projections, zero, one or two projections of the other kind may engage. The projections are specifically arranged in different angular positions other than the regular arrangement in a gear wheel. The different angular arrangement is preferably determined by a random generator.

The insert piece is either formed as having a head and a shaft, or it is configured as a ring. In the first case, the main piece comprises a receiving bore for the shaft. The shaft is provided to be accommodated in the receiving bore and is formed accordingly. In the second case, the main piece has an axial connector, an internal bore of the ring fitting onto that axial connector. The outer shell of the head or that of the ring forms the inner edge. Advantageously, the receiving bore or the axial connector are centrically arranged to the rotational axis. They may also be excentrically arranged.

In a preferred embodiment of the disclosure, the insert piece, once it is inserted, is releasably attached to the main piece. It is especially pressed into the receiving bore of the main piece or is pressed onto the axial connector. By a releasable connection, a connection is understood, which is separable without destruction. Preferably, the insert piece, when inserted into the main piece, is mechanically deformed, such that separation is no longer possible.

A special advantage of the disclosure resides in that the main piece and the insert piece, prior to assembling into the screw part, may be produced in series, may very exactly be machined, and also finally may be hardened or surface-treated. Hence, the finished screw part is not required to be treated in any way, but rather the final step during fabrication of the screw parts is assembling the main piece and the insert piece. In this way, the annular recess may be fabricated with extreme accuracy.

Preferably, at least the main piece or the insert piece is a one-piece part, especially both are respective one-piece parts. In this way, fabrication will be simplified.

BRIEF DESCRIPTION OF THE DRAWINGS

Further advantages and feature will become apparent from the description following and the working examples of the disclosure which are to be understood as being non-limiting and are explained in more details by making reference to the drawings, wherein.

DETAILED DESCRIPTION OF THE DRAWINGS

Figure 1:
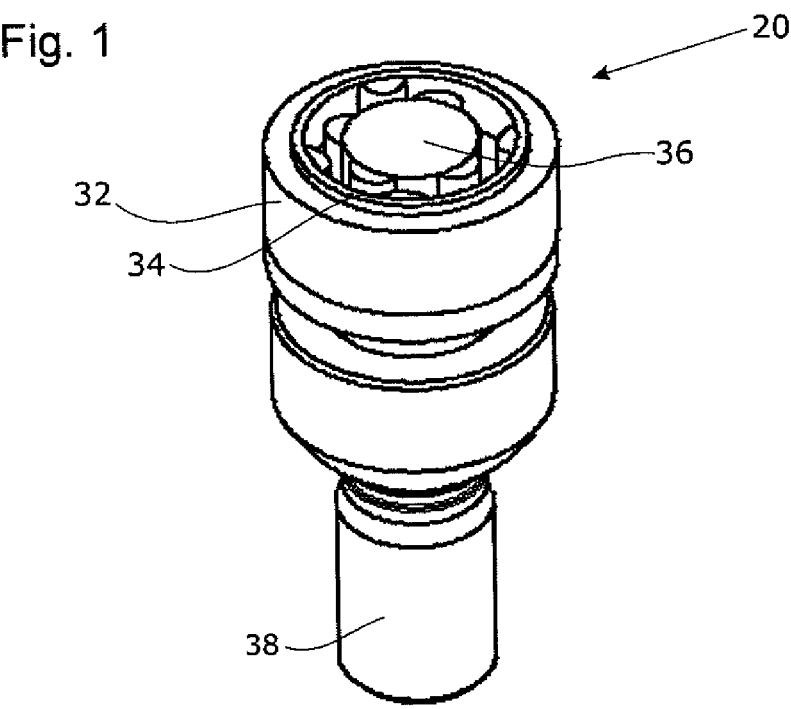
FIG. 1: is a perspective view of an anti-theft screw part, which is formed as a bolt and comprising a main piece and an insert piece.
Figure 2:
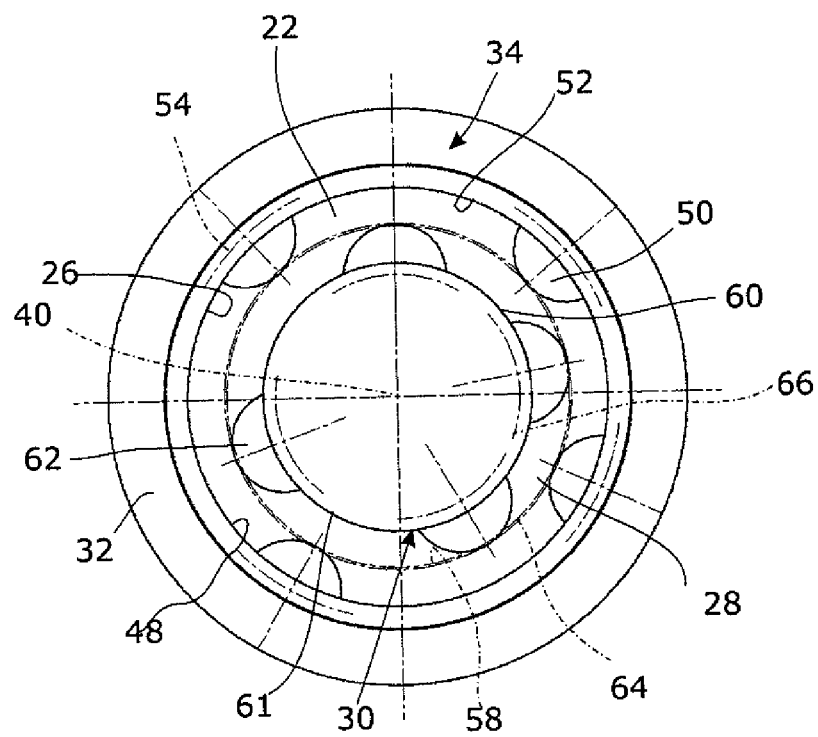
FIG. 2: is a top view of a head region of the screw part of FIG. 1, FIG. 3: is an axial sectional representation of a head region of the screw part of FIG. 1, FIG. 4: is a sectional view along the sectional plane IV-IV in FIG. 3, FIG. 5: is a lateral view of an insert piece similar to that of FIGS. 1 and 2, FIG. 6: is a top view of the head of the insert piece of FIG. 5, FIG. 7: is a lateral view of an adapter for a screw part similar to FIG. 1, and FIG. 8: is a sectional view along the sectional plane VIII-VIII in FIG. 7.
Figure 3:
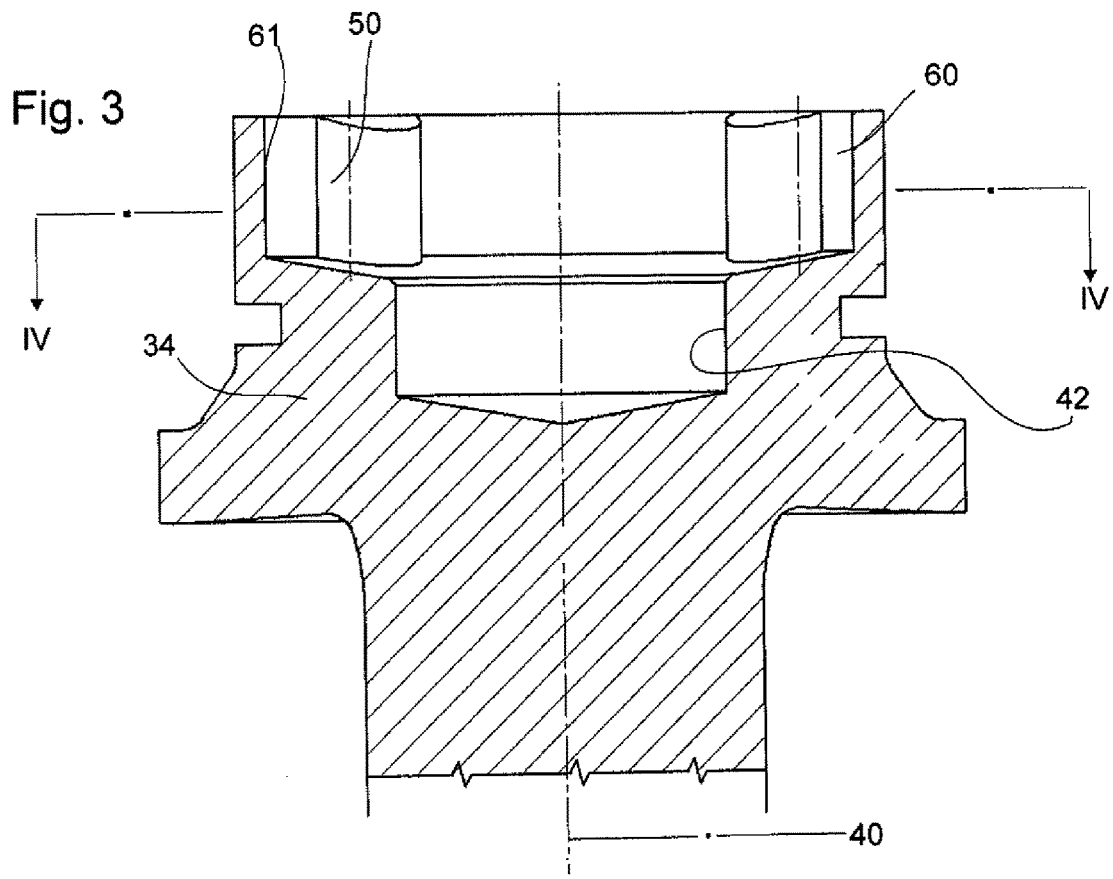
Figure 4:
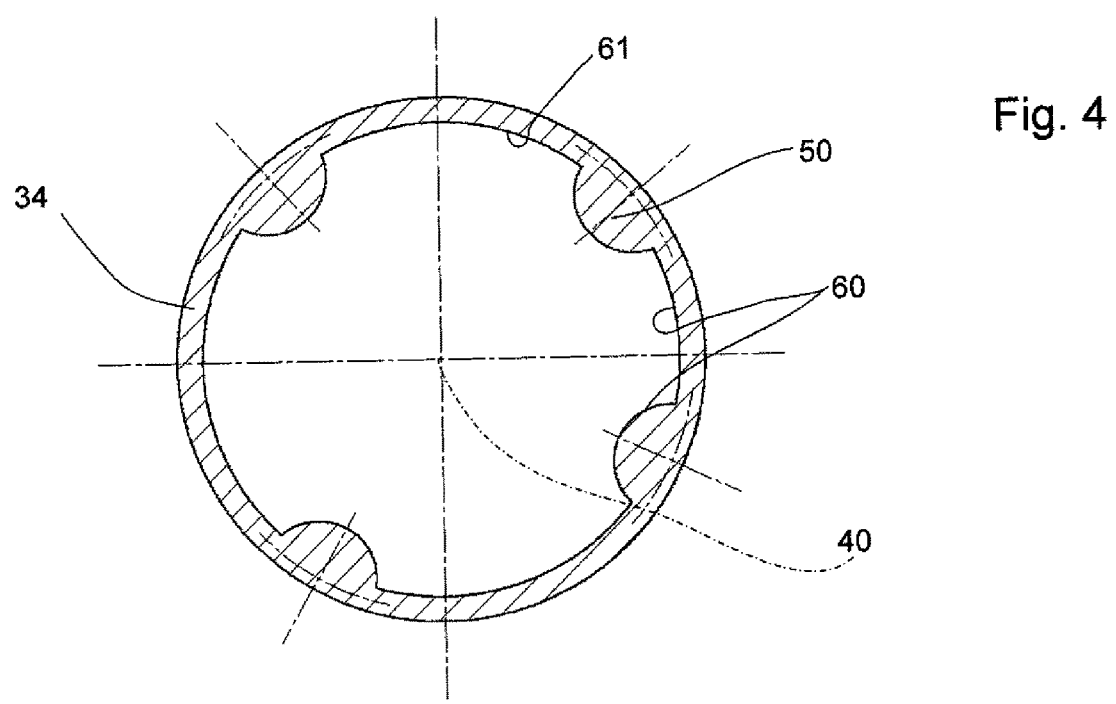

The anti-theft screw part, throughout the working examples of FIGS. 1 to 6, is realized as a bolt, but instead, may also be realized as a nut. At a free end region 20, an annular recess 22 for engagement of an adapter 24 (cf. FIGS. 7 and 8) is axially provided. The annular recess allowing form-fitting engagement with the adapter 24 matching respective encryption locking, so that the screw part may be rotated. The annular recess 22 has an outer edge 26, a bottom 28 and an inner edge 30, which each are circumferential and transversally extending to a radial axis. At least one of said edges 26 or 30, in the working example of FIGS. 1 and 2 both of them, form abutment faces for the adapter 24.

The screw part is composed of a main piece 34 and an insert piece 36. At the main piece 34 a threaded portion 38 is located, which is centrically formed around a rotational axis 40. The main piece 34 has all features of a screw part, it may thus serve for attachment of the wheels to a motor vehicle even without the insert piece 36. Without the insert piece 36, however, theft protection is reduced.

The main piece 34 forms the outer edge 26 and the bottom 28 of the annular recess 22. The inner edge 30 of said annular recess 22 is realized by the insert piece 36. By the two-piece configuration, the annular recess 22 may be fabricated in series and may be fabricated with high accuracy, especially the bottom 28 and the passage between the bottom 28 and the inner edge 30 may be formed with high accuracy. As it is shown in the figures, both edges 26, 28 are essentially of the same length in an axial direction. Moreover, in the assembled state they are directly opposite to each other. They extend parallel to the rotational axis 40.

The insert piece 36 is configured hard and solid and is anchored in the main piece 34 such that it may not easily be destroyed or removed. The main piece 34 has a receiving bore 42 for the insert piece 36. In the configuration of FIGS. 1 to 4, said receiving bore 42 is configured centrically to the rotational axis 40. It is also cylindrical. The insert piece 36 has a head 44 and a shaft 46. The shaft 46 is configured such that it is somewhat over-dimensioned in relation to the receiving bore 42 and may be pressed thereinto.

Figure 5:
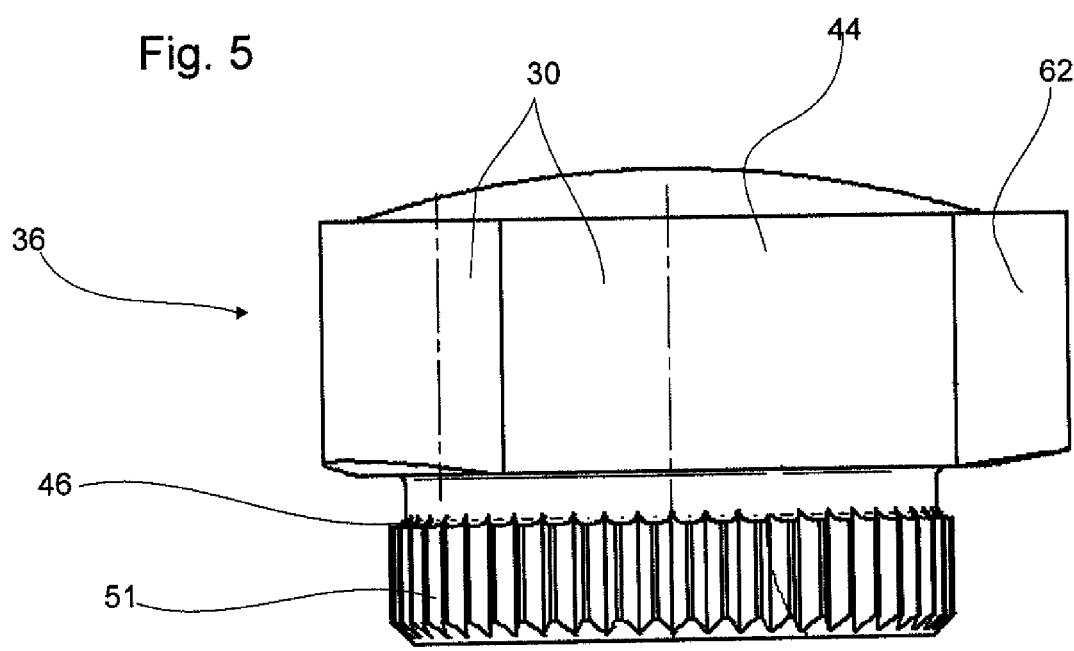
Figure 6:
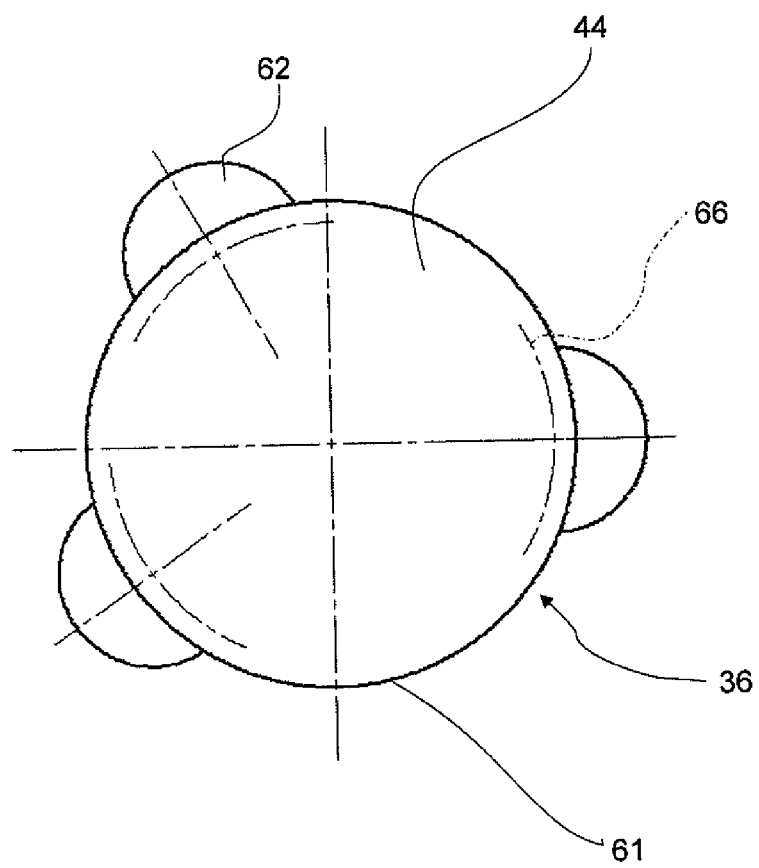

In the working example that is shown in FIGS. 5 and 6, the head 44 has an outer diameter, which corresponds to the outer diameter of the shaft 46, with a deviation of ±25%. The shaft 46 may have a larger or smaller radial dimension than the head (44) or both may have approximately the same dimensions. The head 44 of the insert piece 36, in the axial direction, is longer than the shaft 46. Preferably, the shaft 46, in the axial direction, is as long as 20 to 80%, preferably about half as long as the head 44.

The shaft 46, at its outer face, has axial grooves 51, which, when pressing, deform the shafts 46 into the receiving bore 42.

The insert piece 36 may be inserted into the receiving bore 42 in any rotational position. The once selected rotational position will be maintained and cannot be changed unless it will be destroyed. At every new rotational position, the respective course of the annular recess 22 changes.

The main piece 34 and the insert piece 36 have already undergone final processing, prior to assembling, e.g. have also been surface-treated. Two-colored configurations may also be realized. Moreover, it is not required for the assembled screw part to be treated. It rather may be packed immediately after assembling the main piece 34 and insert piece 36. Time-consuming assignment of the respective encryption lock in a follow-up working run is thus not required. It is with a large number of the possible encryption locks that it will be achieved according to the disclosure, that this represents significant improvement of the production procedure of the screw parts.

The outer edge 26 is defined and limited by an outer wall surface 48 and several internal recesses 50. The outer wall surface 48 is located on an outer circle 52. By n, the number of the internal projections 50 is indicated. In the working example shown in the FIGS. 1 to 4, n=4. The number of n may be between 2 and 8, preferably n is between 3 and 5, especially n has the value of 3 or 4. The internal projections 50 are each formed as a cylinder segment, having an upper end surface that is located in the radial plane, as viewed in FIG. 2. The cylinder segments, which form the internal projections 50 extend appx. across 150°. They are formed by circles the center of which is located on an outer partial circle 54. It has a diameter, which is 5 to 12%, preferably about 8% larger than the diameter of the outer circle 52. Typical values for the diameter of the outer circle 52 are in the range of 12 to 22, especially 15 to 20 mm. As the partial outer circle 54 is located further to the exterior than the outer circle 52, the internal projections 50 entering the outer circle 52 with an angle of about 75 to 80°. The internal projections 50 are all structurally identical. They are arranged distributed in as many different angles as possible along the circumference of the outer circle 52. Radially inwards, they have a vertex that is located on a first circular line 58.

The inner edge 30 is limited by an inner wall surface 60 and several, i.e. m, outer projections 62. In the working example shown in the FIGS. 1 to 4 m=4. In the configuration of the FIGS. 5 and 6 m=3. Preferably, m is between 3 and 5, especially m has the value of 3 or 4. The inner wall surface 60 is located on an outer circle 61. The outer projections 62 are essentially structurally identical to the internal recesses 50. They radially project outwards to a second circular line 64. Said second circular line 64 is located completely exterior of the first circular line 58. The diameter thereof preferably is at least 2%, especially at least 5% larger than the diameter of the first circular line 58. The outer projections 62 are each formed as a cylinder segment and have an upper end surface that is located in the radial plane, as seen FIG. 2. The cylinder segments, which form the outer projections 64 extend across appx. 210°.

In addition, the outer projections 64 are designed starting from a partial circle, i.e. an inner partial circle 66. Said partial circle is located inwardly offset by the same extent, starting from the second circular line 64, as the partial outer circle 54 is outwardly offset in relation to the outer circle 52. This dimension is appx. 2 to 6% of the diameter of the outer circle 52. The outer projections 62 are structurally identical to each other. Due to the design described the internal projections 50 and outer projections 62 are essentially structurally identical. In addition, the outer projections 62 are distributed along the circumference as irregular as possible, in this case along the second circular line 62. In axial direction, the internal projections 50 and the outer projections 62 have the same dimensions, the dimensions maximally differing by 20%. They each extend axially along the same height, like the outer wall surface 48 or the inner wall surface 60, respectively. The outer wall surface 48 and the inner wall surface 60 are each defined by cylinder surfaces.

As viewed along the circumference, the internal projections 50 are arranged, where a gap between the external projections 62 is present. In each one of the gaps between two recesses, as it is shown in the working examples, one projection of the other type may be provided, but there may as well be provided no gap, or two projections of the other type may be provided. An inner projection 50 and an adjacent outer projection 62 always have the same clearance in relation to each other, which is larger than the following differences: a) radius of the outer circle 52 minus radius of the second circular line 64 and b) radius of the first circular line 58 minus radius of the outer circle 61. In the working example shown in the FIGS. 1 to 4, said two differences are equally large, a deviation of ±5% being possible.

Figure 7:
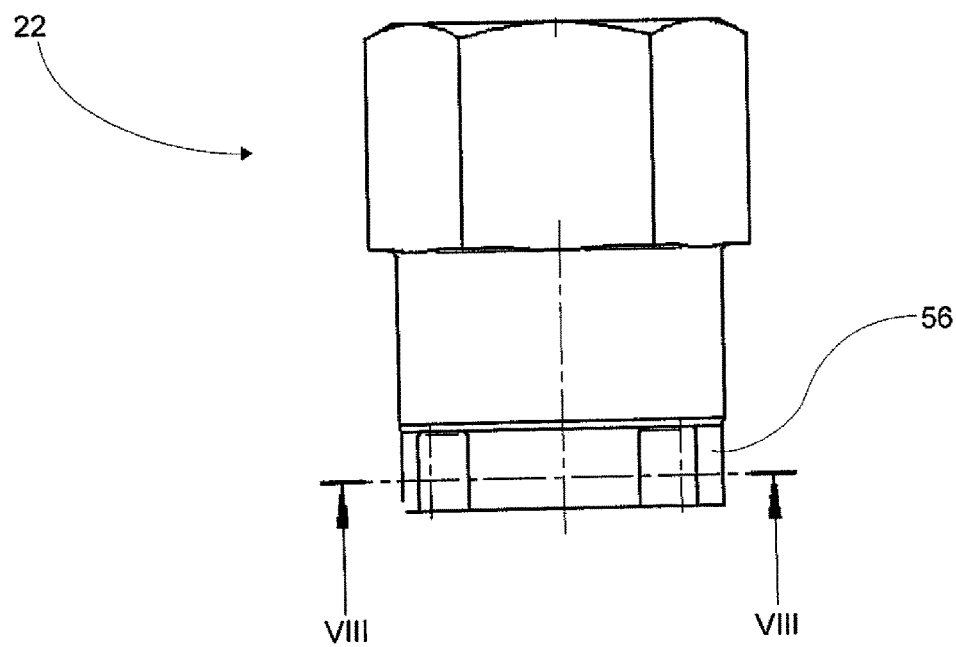
Figure 8:
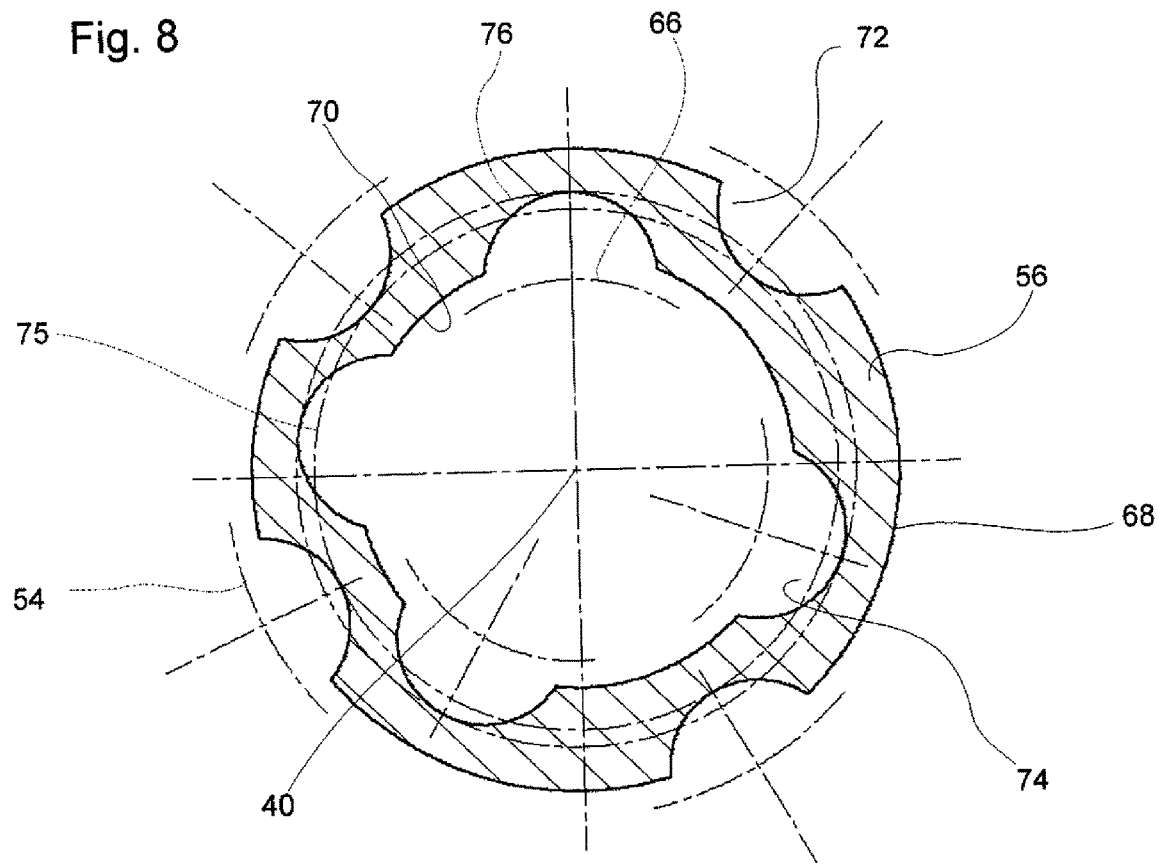

FIGS. 7 and 8 show an adapter 24. The adapter 24 has a projection 56, which is adapted to the annular recess 22. The association of the annular recess 22 to the adapter 24 is selected such that only one single engagement is possible, when the adapter 24 is rotated by 360°, in relation to the screw part, about the rotational axis 40, prior to engaging the recess 22.

The main piece 34 preferably is fabricated by cold forming, especially cold-heading chamfering. In this way, low cost production will be enabled.

FIG. 8 shows as section in the radial plane across the projection 56. Said section is formed such that it exactly fits into the recess 22, engagement being with minimum clearance. The cross section of FIG. 8 is limited by an outer edge 68, which is located on a circular arc with a diameter, which, for fitting, is smaller by the required dimension than the diameter of the outer circle 52. It is limited inwards by an inner edge 70, which is located on a circular arc, which accordingly is somewhat larger than the outer circle 61. For each of the projections 50, 62 an appropriately formed well 72 or 74, respectively, is provided. Four inner wells 72 are provided, which each are adapted to the internal projections 50, and four outer wells 74 are provided, which each are adapted to the outer projections 62. The wells 72, 74 are limited, as are the projections 50, 62, by a cylinder surface of a cylinder segments, but they now are concave as well (and not convex, as are the projections 50, 62. They are designed starting from the same partial circles 54 or 66, respectively, as with the projections 50, 62, but now having (for fitting) adapted somewhat larger radius of the circle, i.e. a slightly larger g (e.g. 2% to 5%) radius than for the cylinder wall than the projections 50 or 62 respectively. The latter have a radius of about 20 to 35%, preferably about 28% of the radius of the outer circle 52. The inner wells 72, with their vertexes, are located on a first edge line 75, the diameter of which is slightly smaller than the diameter of the first circular line 58. The four outer wells 74 have vertexes that are located on a second edge line 76, the diameter of which is slightly larger than that of the second circular line 64. Due to the extra dimension for fitting, the difference of the radii of the first edge line 75 and the second edge line 76 is significantly larger than the difference of the radii of the first circular line 58 and the second circular line 64. Here in turn, it applies for the second edge line 76 to have a larger diameter, in this case a diameter of at least 5%, especially 8% larger than the first edge line 75. The first edge line 75 is located completely within the second edge line 76.

As seen in a plane transversally to the rotational axis 40, the projection 56 throughout has a dimension, as measured at any measuring line oriented in that plane, which is not smaller than the difference of radii of outer edge 68 minus second edge line 76 or difference of radii of first edge line 75 minus inner edge 70. In the working example shown in the FIGS. 7 and 8, these two differences are equally large, a deviation of ±5% being possible. The cross section shown according to FIG. 8 does not change along the axial height of projection 56.

The adapter 24 and/or the main piece 34 have a hardness of 450+50HV.

The anti-theft screw part has an annularly extending recess 22 for engaging an adapter 24, which recess 22, as seen from an inward direction, is limited by an outer edge 26, a bottom 28 and an inner edge 30. The screw part is assembled of a main piece 34 and an insert piece 36. The main piece 34 forms the outer edge 26, the inner edge 30 is formed by the insert piece 36. The outer edge 26 is limited by an outer wall surface 48, which is located on an outer circle 52, and by several internal projections 50, which project from the outer circle 52 towards the rotational axis 40 up to a first circular line 58. The inner edge 30 is limited by an inner wall surface 60, which is located on an outer circle 61 and furthermore is limited by several outer projections 62, which project from the outer circle 61 outwards up to a second circular line 64. The first circular line 58 is located completely within the second circular line 64. The diameter of the second circular line 64 is larger than the diameter of the first circular line 58.

The invention claimed is:

1. An anti-theft screw part comprising: a rotational axis and a recess formed at a free end region of the screw part and annularly extending, for engaging an adapter for rotating the screw part, which recess, as viewed from the outward to the inward direction, is limited by an outer edge, a bottom and an inner edge, wherein at least one of these edges form abutment faces for the adapter, the screw part is assembled of a main piece and an insert piece that are assembled and are firmly attached to each other, the main piece forming the outer edge and the inner edge being formed by the insert piece, the outer edge being limited by an outer wall surface located on an outer circle, wherein the outer edge is limited by a plurality of internal projections, which project from the outer circle towards the rotational axis to a first circular line, in that the inner edge is limited by an inner wall surface located on an inner circle and a plurality of outer projections, which project from the inner circle towards an exterior to a second circular line, in that the first circular line is located completely within the second circular line, in that the diameter of the second circular line is larger than the diameter of the first circular line, and in that the internal projections and the outer projections are formed as cylinder segments.

2. The anti-theft screw part according to claim 1, wherein i) the cylinder segments of the internal projections extend across less than 180 degrees around the circumference of the outer circle, but more than 120 degrees around the circumference of the outer circle, and ii) the cylinder segments of the outer projections extend 150 to 210 degrees around the circumference of the outer circle.

3. The anti-theft screw part according to claim 1, wherein all of the internal projections have the same shape or all of the outer projections have the same shape.

4. The anti-theft screw part according to claim 1, wherein the number of the internal projections is equal to the number of the outer projections or the number of the outer projections differs from the number of the internal projections by a maximum of 2.

5. The anti-theft screw part according to claim 1, wherein the number of the internal projections plus the number of the outer projections ranges from six to twelve.

6. The anti-theft screw part according to claim 1, wherein the recess, as viewed in a plane transversally to the rotational axis, has at least one radial region in the form of a circular sector, wherein a first gap width in the plane is determined by the difference between the radii of the outer circle and the inner circle, and further includes a plurality of radial regions in the form of a circular sector, wherein a second gap width is determined by the difference between the radii of the outer circle and the second circular line, or by the difference between the radii of the first circular line and the outer circle.

7. The anti-theft screw part according to claim 6, wherein a gap dimension of the recess, as viewed in a plane transversally to the rotational axis, at no location and with any measuring line orienteered in the plane, is smaller than the difference between the radii of the outer circle and the second circular line, or the difference between the radii of the first circular line and the outer circle.

8. The anti-theft screw part according to claim 1, wherein the outer projections are arranged across unequal angles across the inner circle, or the internal projections are distributed across unequal angles across the outer circle.

9. The anti-theft screw part according to claim 1, wherein the main piece either has a receiving bore wherein the insert piece has a head and a shaft, adapted to the receiving bore, or the main piece has an axial connector wherein the insert piece is annular and has an internal bore adapted to the connector.

10. The anti-theft screw part according to claim 1, wherein the main piece or the insert piece is a one-piece part.

11. The anti-theft screw part according to claim 1, wherein the diameter of the second circular line is at least 5% larger than the diameter of the first circular line.

\* \* \* \* \*